United States Patent
Ben-David et al.

(10) Patent No.: US 11,782,456 B2
(45) Date of Patent: Oct. 10, 2023

(54) DEVICE, SYSTEM AND A METHOD FOR MAGNETICALLY DOCKING A FLYING APPARATUS

(71) Applicant: INDOOR ROBOTICS LTD., Ramat-Gan (IL)

(72) Inventors: Doron Ben-David, Ramat-Gan (IL); Amit Moran, Tel-Aviv (IL); Hadar Isserlis, Kokhav Ya'ir (IL); Itay Gabizon, Bnei Brak (IL)

(73) Assignee: INDOOR ROBOTICS LTD., Ramat (IL)

( * ) Notice: Subject to any disclaimer, the term of this patent is extended or adjusted under 35 U.S.C. 154(b) by 512 days.

(21) Appl. No.: 17/008,669

(22) Filed: Sep. 1, 2020

(65) Prior Publication Data

US 2022/0066473 A1   Mar. 3, 2022

(51) Int. Cl.
| | | |
|---|---|---|
| *B64F 1/00* | (2006.01) | |
| *B64F 1/12* | (2006.01) | |
| *G05D 1/10* | (2006.01) | |
| *B64C 39/02* | (2023.01) | |
| *B64U 70/00* | (2023.01) | |
| *B64U 101/00* | (2023.01) | |

(52) U.S. Cl.
CPC ............ *G05D 1/102* (2013.01); *B64C 39/024* (2013.01); *B64F 1/007* (2013.01); *B64F 1/125* (2013.01); *B64U 70/00* (2023.01); *B64U 2101/00* (2023.01)

(58) Field of Classification Search
CPC ......... B64U 70/00; B64U 70/99; B64F 1/007; B64F 1/12; B64F 1/125; B64C 39/024; B64C 25/32
See application file for complete search history.

(56) References Cited

U.S. PATENT DOCUMENTS

| | | | |
|---|---|---|---|
| 2016/0221688 A1* | 8/2016 | Moore | F21V 33/00 |
| 2019/0229462 A1* | 7/2019 | Hodgson | H01R 13/6205 |
| 2020/0172231 A1* | 6/2020 | Abdellatif | G01N 29/225 |
| 2021/0347500 A1* | 11/2021 | Hagan | B64C 39/024 |

\* cited by examiner

*Primary Examiner* — Philip J Bonzell
*Assistant Examiner* — Colin Zohoori
(74) *Attorney, Agent, or Firm* — ALPHAPATENT ASSOCIATES, LTD; Daniel J. Swirsky

(57) ABSTRACT

A docking system for docking an aerial vehicle, including an interface configured to secure the docking system to a stationary element located above the ground, a housing, mechanically coupled to the interface, a docking magnetic member located in the housing, the docking magnetic member is configured to attract an aerial magnetic member of the aerial vehicle, a docking element mechanically coupled to the housing, where the docking element defines a minimal distance between the docking magnetic member and the aerial vehicle when the aerial vehicle docks in the docking system, and a maneuver mechanism for adjusting a distance between the docking element and the docking magnetic member.

15 Claims, 7 Drawing Sheets

DEVICE, SYSTEM AND A METHOD FOR MAGNETICALLY DOCKING A FLYING APPARATUS

FIELD

The invention relates to docking devices of unmanned aircraft.

BACKGROUND

More and more fields are utilizing Unmanned Aerial Vehicles (UAVs), such as multirotor copters and similar Vertical Take-Off and Landing (VTOL) aircrafts. These aerial vehicles are used in many fields and are about to be used in even more as time goes on. In order to fly around without being connected to a power source, the aerial vehicle utilizes an internal power source which in most cases is rechargeable. The charging of the rechargeable power source is typically done by either connecting the aerial vehicle to a suitable docking station or directly to a power source (such as the domestic electrical grid). The aerial vehicles may employ location and position mechanisms such as GPS, vision sensors, distance sensors and the like.

In order to charge the aerial vehicle in a docking station, the aerial vehicle is required to navigate to the docking station, dock itself to the docking station, and to maintain a docking position on the docking station. However, the docking usually requires computational and hardware resources. Since aerial vehicles are influenced a lot by weight, such hardware resources and computational resources may be relieved from the aerial vehicle, causing the aerial vehicle to function better.

Therefore, there is a great need for a device that would help aerial vehicles to dock and maintain the position thereof after docking thereon.

SUMMARY

In one aspect of the invention a docking system is provided for docking an aerial vehicle, including an interface configured to secure the docking system to a stationary element located above the ground, a housing, mechanically coupled to the interface, a docking magnetic member located in the housing, the docking magnetic member is configured to attract an aerial magnetic member of the aerial vehicle, a docking element mechanically coupled to the housing, where the docking element defines a minimal distance between the docking magnetic member and the aerial vehicle when the aerial vehicle docks in the docking system, and a maneuver mechanism for adjusting a distance between the docking element and the docking magnetic member.

In some cases, the docking magnetic member is a ferromagnetic member forming a magnetic field with a magnet held by the aerial vehicle. In some cases, the docking magnetic member is a magnet forming a magnetic field with a ferromagnetic member held by the aerial vehicle. In some cases, the docking magnetic member is a magnet forming a magnetic field with a magnetic member held by the aerial vehicle. In some cases, the docking system further including a processing module configured to control the operation of the maneuver mechanism.

In some cases, the docking system further including a wireless receiver for receiving wireless signals from another device, the wireless receiver is coupled to the processing module, where the maneuver mechanism adjusts a distance between the docking element and the docking magnetic member in response to receiving the wireless signals.

In some cases, adjusting a distance between the docking element and the docking magnetic member includes moving at least one element of a group including the docking element and the docking magnetic member. In some cases, the maneuver mechanism moves at least one element of a group including the docking element and the docking magnetic member in a linear movement. In some cases, the maneuver mechanism includes an actuator and a belt drive, the actuator moves the belt drive, and where one or more screws rotate while moving linearly towards or away from a top section of the docking system, the one or more screws move in response to movement of the belt drive. In some cases, the maneuver mechanism moves at least one element of a group including the docking element and the docking magnetic member in a rotational movement.

In some cases, the maneuver mechanism includes a shaft moving in a rotational movement and elastic straps secured on one side to the shaft and on another side to the docking element or to the docking magnetic member, where the docking element or the docking magnetic member are secured to the housing via a hinge, such that movement of the shaft moves at least one of the docking element or the docking magnetic member around the hinge. In some cases, the maneuver mechanism moves at least one element of a group including the docking element and the docking magnetic member in a non-linear movement.

In some cases, the maneuver mechanism is configured to move the docking magnetic member between a first position in which the aerial vehicle is docked to the docking system to a second position in which the aerial vehicle is not docked to the docking system.

In some cases, the docking element is located in a bottom surface of the housing. In some cases, the interface is located in a top surface of the housing. In some cases, the actuation mechanism operates in response to receiving electrical power from the aerial vehicle.

BRIEF DESCRIPTION OF THE DRAWINGS

The invention may be more clearly understood upon reading of the following detailed description of non-limiting exemplary embodiments thereof, with reference to the following drawings, in which.

Figure 1:
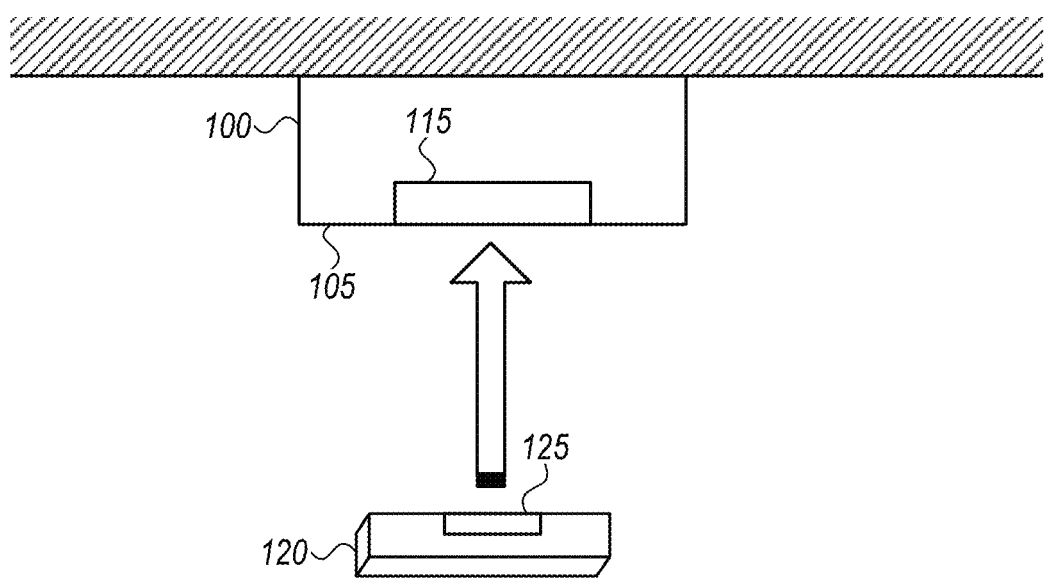
FIG. 1 shows a docking system and an aerial vehicle docking into the docking system when a magnetic field is created between the aerial vehicle and the docking system, according to exemplary embodiments of the subject matter.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a docking system and method for docking an aerial vehicle. Docking may be defined as a "last mile" approach of the aerial vehicle to the docking system, ending with physical contact between the aerial vehicle to the docking system. The docking system comprises an interface located in the docking system, said interface is configured to secure the docking system to a stationary element located above the ground. The interface may be located in a top portion of the docking system, in one of the sides of the docking system, or in a bottom portion of the docking system. The stationary element may be a ceiling, a shelf, a pole extending from a wall, and the like. The docking system enables to dock the aerial vehicle under the stationary element.

The docking system comprises a housing, mechanically coupled to the interface and a docking magnetic member located inside the housing. The docking magnetic member is configured to attract an aerial magnetic member of the aerial vehicle by creating a magnetic field with a magnetic member held by the aerial vehicle. The term held by is defined by containing or carrying the magnetic member held by the aerial vehicle. The docking magnetic member may be removable or replaceable from the aerial vehicle. The docking system comprises a maneuver mechanism for moving a component of the docking system when wishing to release the aerial vehicle from the docking system, to reduce the magnetic field formed between the docking magnetic member and the aerial vehicle. The maneuver mechanism may move the docking magnetic member from a first position to a second position. The first position may create the magnetic field with the aerial vehicle, while in the second position, the magnetic field is weaker with respect to the first position and the aerial vehicle is released from the docking system. In some exemplary cases, the movement of the docking magnetic member may vary based on properties of the aerial vehicle. For example, different aerial vehicles may form magnetic fields of different strengths with the docking magnetic member, for example based on a magnetic member held by the aerial vehicle.

The docking system may also comprise a docking element defining a minimal distance between the magnetic member and the aerial vehicle when the aerial vehicle docks in the docking system. The docking element may be part of the housing. The docking element may be located in a lower portion of the docking system. The docking element may be located outside the housing, being mechanically coupled to the housing.

FIG. 1 shows a docking system and an aerial vehicle attaching into the docking system when a magnetic field is created between the aerial vehicle and the docking system, according to exemplary embodiments of the subject matter. A docking station comprising a magnetic latching system, according to exemplary embodiments of the subject matter. In some embodiments, a docking station 100 comprising a bottom section 105 facing downwards. In some embodiments, the docking station 100 may be attached to a ceiling, a pole and the like. The docking station 100 comprises an interface configured to enable hanging the docking station 100 above the ground, for example hang from the ceiling, an illumination module or secured to a wall. The interface may be located in the top section of the docking station, the section facing upwards. The top section may consume the topmost 10-90 percent of the docking station's height, as desired by a person skilled in the art. The interface may be adhesive material in the top section or side surface of the docking station 100. The interface may be any type of mechanism to which an object can be secured, such as a hook or loop, adhesives, screws and the like. The docking station 100 utilizes at least one magnetic component 115, configured to dock an aerial vehicle 120 comprising a magnetic member 125 located on the upper side thereof, to the docking station 100. When docking, the docking station 100 may provide electrical power to the aerial vehicle 120. When the aerial vehicle 120 hovers below the docking station 100 and upon ascending thereto, the magnetic component 115 forms a magnetic field with the magnetic member 125 of the aerial vehicle 120. When releasing the aerial vehicle 120 from the docking station 100, the magnetic component 115 may be moved upwards, away from the aerial vehicle 120.

Figure 2A:
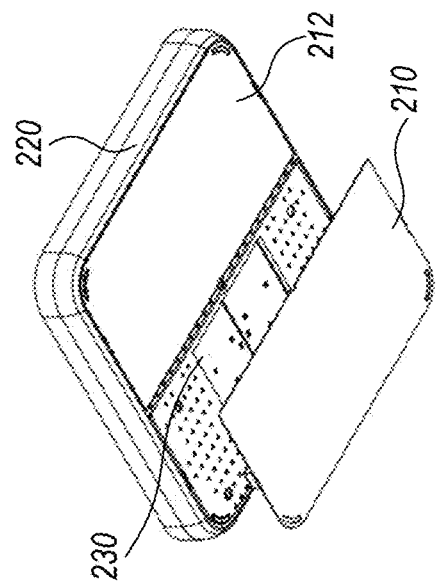
FIGS. 2A-2B show a docking station with a movable docking magnetic member, according to exemplary embodiments of the subject matter.
Figure 2B:
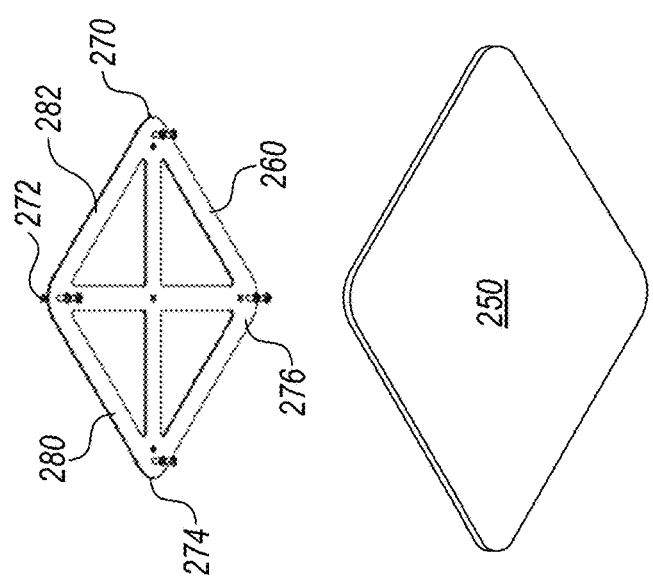
Figure 2B:
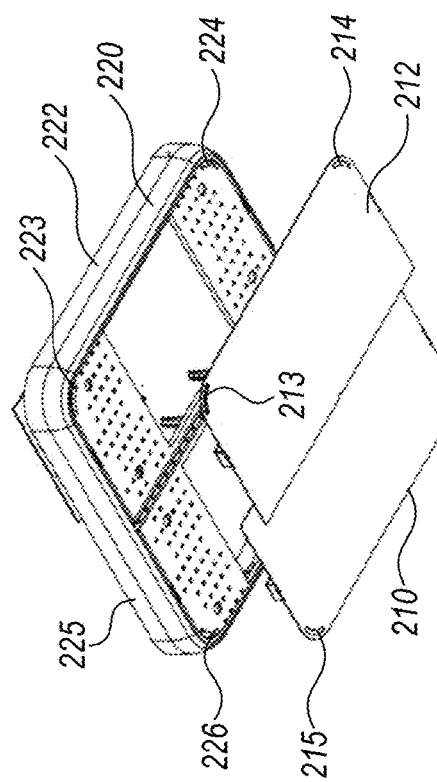

FIGS. 2A-2B show a docking station with a movable docking magnetic member, according to exemplary embodiments of the subject matter. The docking magnetic member may be a magnet or a ferromagnetic element. The docking system comprises an interface 260 configured to connect the docking system to the stationary element. The interface 260 may have an upper surface having a shape that fits the shape of the stationary element, for example a flat cross section that fits a flat ceiling, or a pyramid shape in case the docking system is located in an attic. The interface 260 may comprise one or more arms 280, 282 and holes 270, 272, 274 and 276 into which screws or other connectors are configured to be inserted, for connecting the interface 260 to the stationary element.

The interface 260 is configured to be secured to a housing 220, for example to an upper surface of the housing 220, located closer to the stationary element. The housing 220 may comprise an upper plate 250, surrounded by a frame, onto which the arms 280, 282 are secured. The upper plate 250 may be connected to frame members 222 and 225 using screws, welding or another connecting mechanism. The frame members 222, 225 form the sidewalls of the housing 220. The bottom wall of the housing 220 may be the docking elements 210, 212. The one or more docking magnetic members, the maneuver mechanism and optional additional components of the docking system may be located inside the housing 220 defined by the frame members 222, 225, above the docking elements 210, 212 and below the upper plate 250.

The housing 220 comprises the docking magnetic member 230 and the maneuver mechanism that moves the docking magnetic member 230. The housing 220 may also comprise electrical circuitry (not shown), for example a controller that controls the operation of moving the docking magnetic member 230. The housing 220 may also comprise an actuation mechanism for moving the docking magnetic member 230 or the docking element disclosed below. The actuation mechanism may be coupled to a motor and a power source. The actuation mechanism is also coupled to the docking magnetic member 230 or the docking element.

In some other cases, the aerial vehicle provides power to the docking system. Such power from the aerial vehicle can later be used to operate the actuation mechanism, for example in case the docking system lacks a power source or in case the power from the power source of the docking station is insufficient. Power may be electrical power. Power may be provided by the aerial vehicle by applying voltage to a conductive component of the aerial system. The conductive component may be in physical contact with the aerial vehicle, for example the docking element. In some other cases, the power is transmitted over a wireless medium.

The docking system also comprises a docking element that defines the minimal distance between the aerial vehicle and the docking magnetic member 230. The docking element may be a part of the housing 220. The docking element may be one or more plates 210, 212, configured to be connected to the housing 220. For example, corners 213 and 214 of plate 212 are attached to corners 223 and 224 of the housing 220. Similarly, corners 215 and 216 of plate 210 are attached to corners (such as corner 226) of the housing 220. Such attachment may be implemented via adhesives or a connecting mechanism such as a screw.

Figure 3:
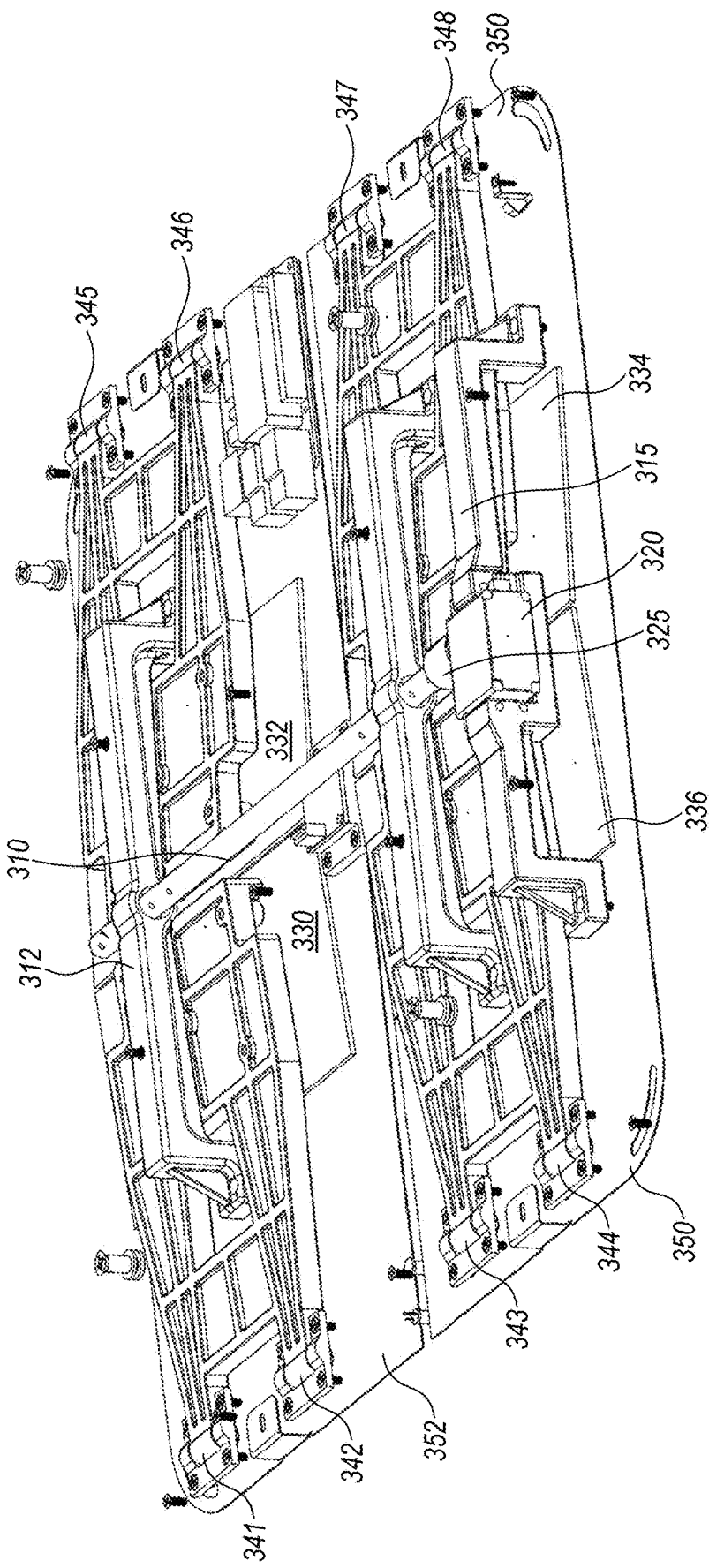
FIG. 3 shows a maneuver mechanism of a docking magnetic member moving in a rotational movement when releasing an aerial vehicle, according to exemplary embodiments of the subject matter.

FIG. 3 shows a maneuver mechanism of a docking magnetic member moving in a rotational movement when releasing an aerial vehicle, according to exemplary embodiments of the subject matter. The maneuver mechanism and the docking magnetic member are secured to the housing of the docking system. In this exemplary embodiment, the docking magnetic member comprises four (4) ferromagnetic plates 330, 332, 334, 336, mounted on a surface. The surface may be base plates 350, 352 of the housing. For example, ferromagnetic plates 330 and 332 are mounted on base plate 352 and ferromagnetic plates 334 and 336 are mounted on base plate 350. The base plates 350 and 352 may be coupled to the frame members 222 and 225 or to the docking elements 210 and 212. The base plates 350, 352 may be located on a bottom section of the housing, or in a lateral section of the housing.

The rotational movement of the ferromagnetic plates 330, 332, 334, 336 is enabled using hinges securing the ferromagnetic plates 330, 332, 334, 336 to the base plate 350. For example, hinges 341 and 342 secure the ferromagnetic plate 330 to the base plate 350, hinges 343 and 344 secure the ferromagnetic plate 336 to the base plate 350, hinges 345 and 346 secure the ferromagnetic plate 332 to the base plate 352 and hinges 347 and 348 secure the ferromagnetic plate 334 to the base plate 350.

When wishing to move the ferromagnetic plates 330, 332, 334, 336, an actuator 320 begins to operate, moving shaft 310 in a rotational movement. The shaft 310 may be connected to the actuator 320 via a shaft connector 325. The actuator 320 is firmly secured to the base plate 350, for example by welding, screws or using adhesives. The shaft 310 may be secured to the base plate 350 using platforms 312 and 315, placing the shaft above the ground level of the base plate 350, enabling free movement of the shaft 310, without friction with the base plate 350.

Rotational movement of the shaft 310 moves one or more straps (not shown) connected to both the shaft and to the ferromagnetic plates 330, 332, 334, 336. When the straps are tensed, they pull the ferromagnetic plates 330, 332, 334, 336 away from the base plate 350. This way, the ferromagnetic plates 330, 332, 334, 336 move away to the aerial vehicle, and reduce an amplitude of a magnetic field with a magnetic member of the aerial vehicle. When wishing to release the aerial vehicle from the docking system, the ferromagnetic plates 330, 332, 334, 336 move away from the aerial vehicle. In some exemplary cases, instead of moving the ferromagnetic plates 330, 332, 334, 336, the maneuver mechanism may move the docking element, which is the surface to which the aerial vehicle engages when docking into the docking system. Moving the docking element away from the ferromagnetic plates 330, 332, 334, 336 may then result in releasing the aerial vehicle from the docking system.

Figure 4A:
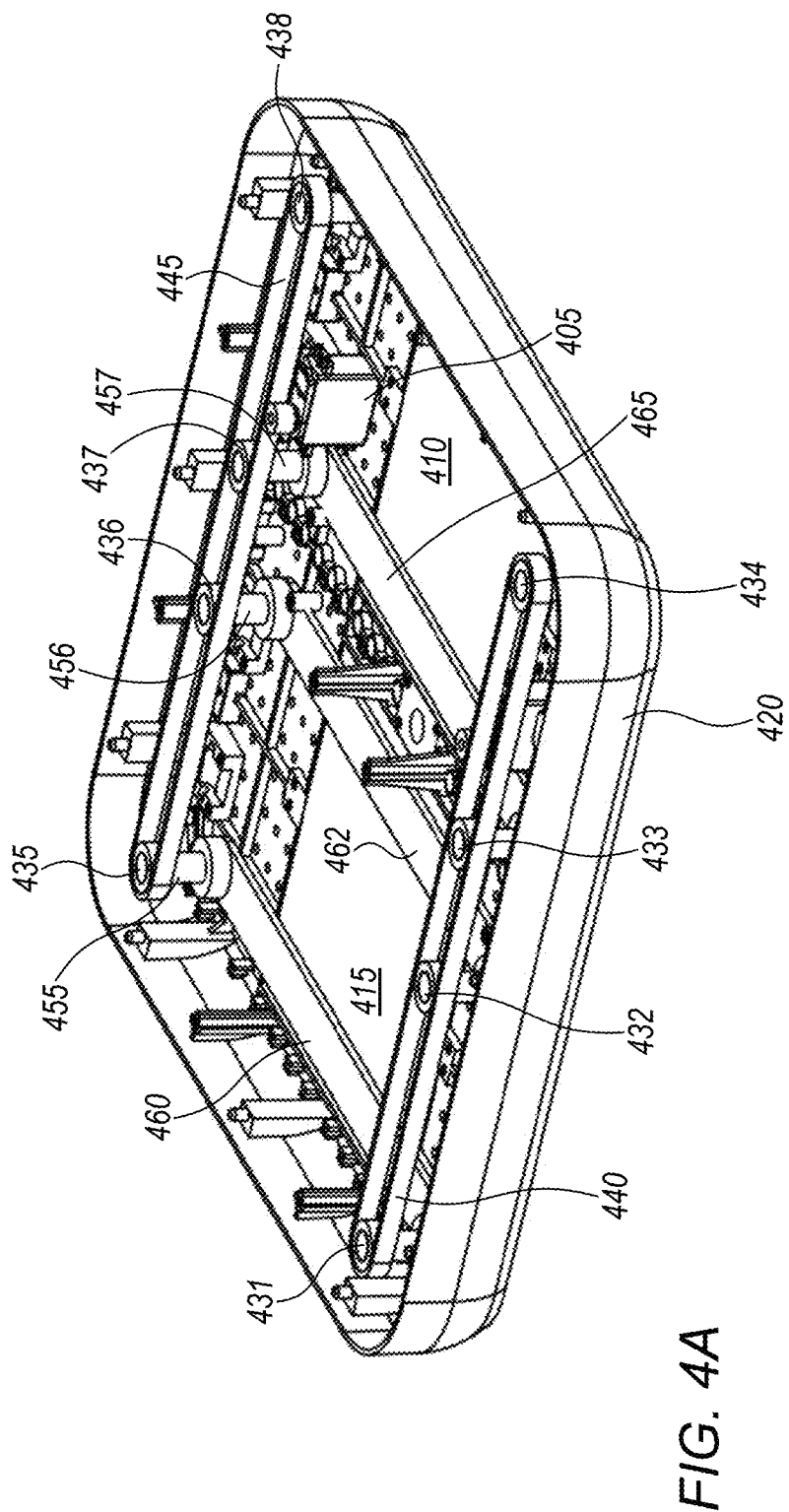
FIG. 4A shows a maneuver mechanism for moving a magnetic member in a linear movement, according to exemplary embodiments of the subject matter.

FIG. 4A shows a maneuver mechanism for moving a magnetic member in a linear movement, according to exemplary embodiments of the subject matter. The maneuver mechanism is mounted inside the housing 420 of the docking system. The maneuver mechanism is coupled to at least one component of the docking system, such as the base plate, the housing 420, the docking element and the like. When wishing to move the docking magnetic members 410, 415, the actuator 405 starts operating. The actuator 405 may be coupled to an electronic wire, such that when the voltage in the electronic wire is higher than a threshold, the actuator 405 begins rotating. The actuator 405 is coupled to a belt drive 445, such that movement of the actuator 405 generates movement of the belt drive 445. In an exemplary movement, the actuator 405 moves in a rotational movement, and the belt drive 445 moves circularly. The maneuver mechanism comprises a second belt drive 440, coupled to the actuator 405, or to another actuator (not shown).

Both the belt drives 440 and 445 are coupled to the docking magnetic members 410, 415 using movable leadscrews 455, 456, 457. The leadscrews 455, 456, 457 move upwards and downwards, towards and away from the docking magnetic members 410, 415, based on the circular movement of the belt drives 440 and 445. The leadscrews 455, 456, 457 are affixed to gear rings. For example, gear rings 431, 432, 433, 434 coupled to belt drive 440 and gear rings 435, 436, 437, 438 are coupled to belt drive 445. In some exemplary cases, the gear rings 431, 432, 433, 434, 435, 436, 437, 438 are located inside the cross section of the belt drives 440 and 445. In some exemplary cases, the movable leadscrews 455, 456, 457 are directly coupled to the docking magnetic members 410, 415, for example using adhesives, welding or a screw mechanism in the docking magnetic members 410, 415. In some other cases, the maneuver mechanism comprises lateral rods 460, 462, 465 secured to the docking magnetic members 410, 415. Hence, when the lateral rods 460, 462, 465 move upwards, the docking magnetic members 410, 415 move upwards accordingly. Movement upwards may be defined as moving away from the docking element, increasing the distance between the docking magnetic members 410, 415 and the aerial vehicle, thereby enabling removal of the aerial vehicle from the docking system.

Figure 4B:
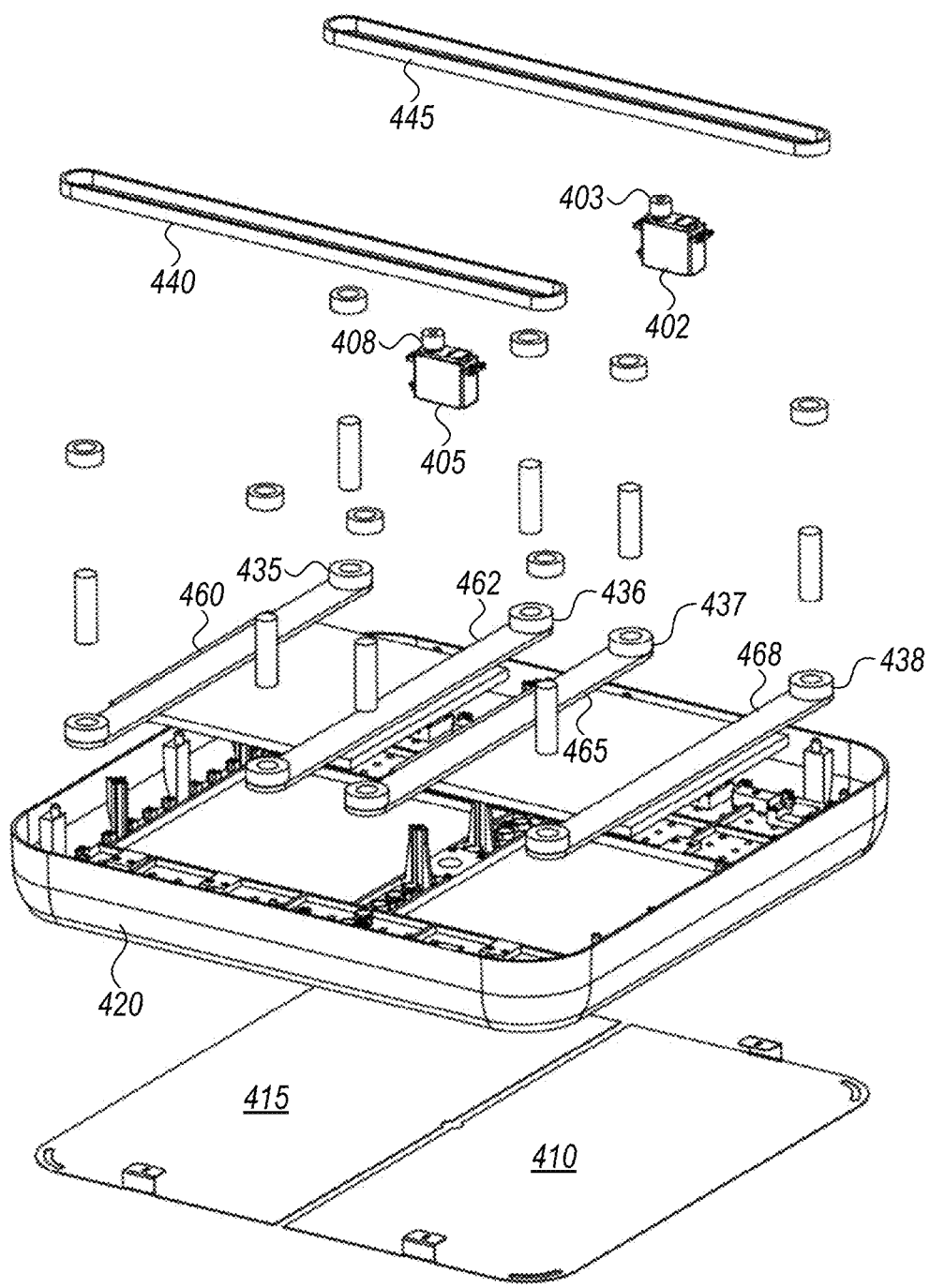
FIG. 4B shows an exploded view of component assembling a maneuver mechanism for moving a magnetic member in a linear movement, according to exemplary embodiments of the subject matter.

FIG. 4B shows an exploded view of component assembling a maneuver mechanism for moving a magnetic member in a linear movement, according to exemplary embodiments of the subject matter. The exploded view shows two actuators 402 and 405. Actuator 402 may be coupled to belt drive 440 and actuator 405 may be coupled to belt drive 445. The exploded view also shows four (4) lateral rods 460, 462, 465 and 468—lateral rods 460 and 462 move docking magnetic member 410 and lateral rods 465 and 468 move docking magnetic member 415. The exploded view also shows two actuator gears 403 and 408, coupled to actuators 402 and 405, respectively. The actuator gears 403 and 408 move rotationally when the actuators 402 and 405 operate, thereby generating the circular movement of the belt drives 440, 445, coupled to the actuator gears 403 and 408.

Figure 5A:
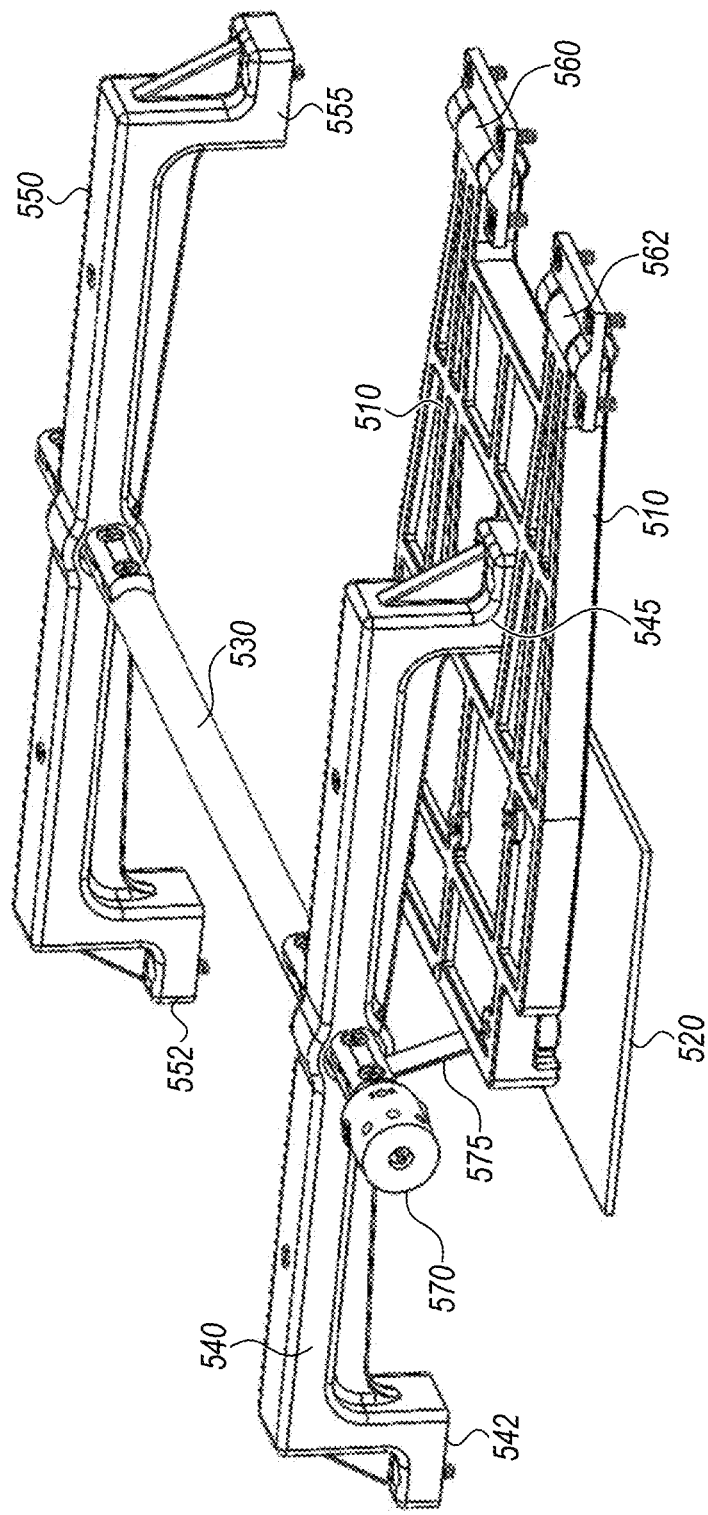
FIG. 5A shows a perspective view of a maneuver mechanism of a docking magnetic member moving in a rotational movement, according to exemplary embodiments of the subject matter.

FIG. 5A shows a perspective view of a maneuver mechanism of a docking magnetic member moving in a rotational movement, according to exemplary embodiments of the subject matter. The actuator moves shaft connector 570 that moves the shaft 530 in a rotational movement. The shaft 530 is firmly coupled to strap 575, such that the arm moves rotationally along with rotational movement of the shaft 530. The arm is also connected to shelf 510, mounted on the docking magnetic member 520. The shelf 510 is firmly secured to the docking magnetic member 520, such that when the strap 575 moves upwards, the shelf 510 moves upwards, lifting the docking magnetic member 520. Similarly, when the strap 575 moves downwards, the shelf 510 moves downwards, moving the docking magnetic member 520 downwards. Movement upwards and downwards of the docking magnetic member 520 changes the distance between the docking magnetic member 520 and the magnetic member of the aerial vehicle, as the aerial vehicle remains in physical contact with the docking element, enabling docking and releasing the aerial vehicle.

The shaft 530 may be secured to platforms 540 and 550, to prevent friction between the shaft 530 and the shelves or the docking magnetic member 520. The platforms 540 and 550 may have platforms extensions 542, 545, 552, 555, located between two shelves. For example, platforms extensions 545 is located above shelf 510. The shelf 510 may be connected to the same docking magnetic member 520 or two multiple docking magnetic members. The shelf 510 are secured to hinges, enabling the rotational movement of the shelf 510 while the shelf 510 and the docking magnetic member 520 are secured to the docking system, for example to the housing of the docking system. For example, shelf 510 is secured to hinges 560 and 562. In some exemplary cases, the shelf 510 may be assembled of multiple shelves, each connected to a hinge secured to the body of the docking system.

Figure 5B:
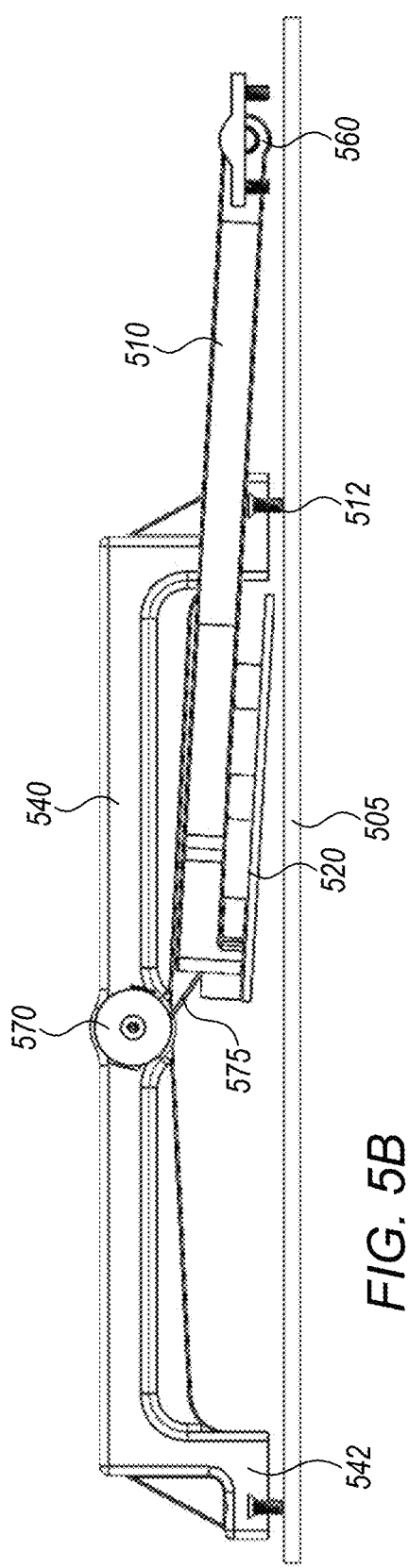
FIG. 5B shows a side view of a maneuver mechanism of a docking magnetic member moving in a rotational movement when releasing an aerial vehicle, according to exemplary embodiments of the subject matter.

FIG. 5B shows a side view of a maneuver mechanism of a docking magnetic member moving in a rotational movement when releasing an aerial vehicle, according to exemplary embodiments of the subject matter. when releasing the aerial vehicle from the docking system, the docking magnetic member 520 moves away from the docking element 505, which defines the distance of the aerial vehicle from the docking magnetic member 520. The slope of the rotational movement of the docking magnetic member 520 may be in the range of 0.5-45 degrees relative to the slope of the docking element 505. The rotational movement of the docking magnetic member 520 is required to form a minimal distance from the aerial vehicle that creates or cancels the magnetic field. The distance may vary based on properties of the docking system as designed by a person skilled in the art, for example in the range of 3-8 millimeters.

Figure 5C:
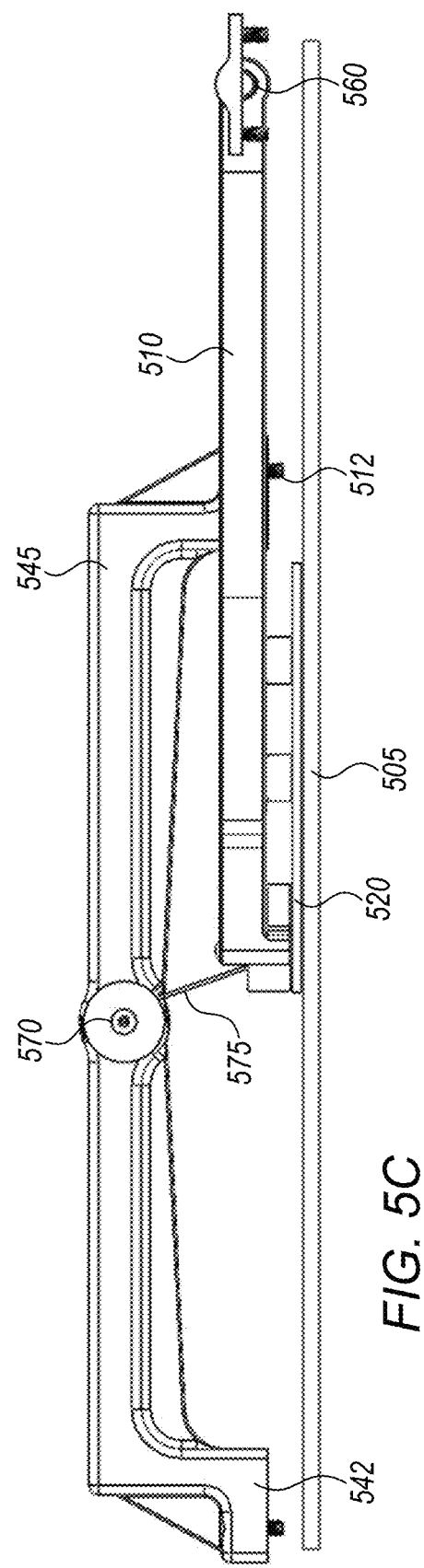
FIG. 5C shows a side view of a maneuver mechanism of a docking magnetic member moving in a rotational movement when docking an aerial vehicle, according to exemplary embodiments of the subject matter.

FIG. 5C shows a side view of a maneuver mechanism of a docking magnetic member moving in a rotational movement when docking an aerial vehicle, according to exemplary embodiments of the subject matter. When the aerial vehicle docks onto the docking system, the shelf 510 and the docking magnetic member 520 may be in a docking position, in their closest position relative to the docking element 505.

It should be understood that the above description is merely exemplary and that there are various embodiments of the invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A docking system for docking an aerial vehicle, comprising:
   an interface configured to secure the docking system to a stationary element located above the ground;
   a housing, mechanically coupled to the interface;
   a docking magnetic member located in the housing, said docking magnetic member is configured to attract an aerial magnetic member of the aerial vehicle;
   a docking element mechanically coupled to the housing, said docking element defines a minimal distance between the docking magnetic member and the aerial vehicle when the aerial vehicle docks in the docking system;
   a maneuver mechanism for adjusting a distance between the docking element and the docking magnetic member,
   wherein adjusting a distance between the docking element and the docking magnetic member comprises moving the docking magnetic member,
   wherein the maneuver mechanism moves the docking magnetic member in a linear movement, and
   wherein the maneuver mechanism comprises an actuator, a belt drive and movable elements coupled to the belt drive, said actuator moves the belt drive, and wherein the movable elements move linearly towards or away from a top section of the docking system in response to movement of the belt drive.

2. The docking system of claim 1, wherein the docking magnetic member is a ferromagnetic member.

3. The docking system of claim 1, wherein the docking magnetic member is a magnet.

4. The docking system of claim 1, wherein the docking magnetic member is a magnet forming a magnetic field with a magnetic member held by the aerial vehicle.

5. The docking system of claim 1, further comprising a processing module configured to control the operation of the maneuver mechanism.

6. The docking system of claim 1, further comprising a wireless receiver for receiving wireless signals from another device, said wireless receiver is coupled to a processing module, wherein the maneuver mechanism adjusts a distance between the docking element and the docking magnetic member in response to receiving the wireless signals.

7. The docking system of claim 1, wherein the maneuver mechanism moves at least one element of a group comprising the docking element and the docking magnetic member in a rotational movement.

8. The docking system of claim 7, wherein the maneuver mechanism comprises a shaft moving in a rotational movement and elastic straps secured on one side to the shaft and on another side to the docking element or to the docking magnetic member, wherein the docking element or the docking magnetic member are secured to the housing via a hinge, such that movement of the shaft moves at least one of the docking element or the docking magnetic member around the hinge.

9. The system of claim 1, wherein the maneuver mechanism is configured to move the docking magnetic member between a first position in which the aerial vehicle is docked to the docking system to a second position in which the aerial vehicle is not docked to the docking system.

10. The docking system of claim 1, wherein the docking element is located in a bottom surface of the housing.

11. The docking system of claim 1, wherein the interface is located in a top surface of the housing.

12. The docking system of claim 1, wherein the actuator operates in response to receiving electrical power from the aerial vehicle.

13. The docking system of claim 1, wherein the movable elements are gear screws.

14. The docking system of claim 1, wherein gear screws rotate in response to movement of the belt drive.

15. The docking system of claim 1, wherein the movable elements are directly coupled to the docking magnetic member.

* * * * *